US011175140B2

(12) United States Patent
Puckett et al.

(10) Patent No.: US 11,175,140 B2
(45) Date of Patent: Nov. 16, 2021

(54) RESONATOR FIBER OPTIC GYROSCOPE WITH INTEGRATED PHOTONICS INTERFACE

(71) Applicant: Honeywell International Inc., Morris Plains, NJ (US)

(72) Inventors: Matthew Wade Puckett, Scottsdale, AZ (US); Neil A. Krueger, Saint Paul, MN (US); Glen A. Sanders, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 80 days.

(21) Appl. No.: 16/566,553

(22) Filed: Sep. 10, 2019

(65) Prior Publication Data

US 2021/0072026 A1    Mar. 11, 2021

(51) Int. Cl.
*G01C 19/72*    (2006.01)
*G02B 6/02*    (2006.01)

(52) U.S. Cl.
CPC ......... *G01C 19/723* (2013.01); *G01C 19/722* (2013.01); *G02B 6/02361* (2013.01)

(58) Field of Classification Search
CPC .. G01C 19/723; G01C 19/722; G01C 19/721; G01C 19/727; G01C 19/72; G01C 25/00; G01C 19/58; G01C 21/16; G01C 19/726; G02B 6/02361; G02B 6/29356; G02B 6/29316; G02B 6/00; G02B 6/02195; G02B 6/29322; H01S 3/10023; Y10T 29/49826; G01P 21/00; G01P 15/093; G01P 15/08
See application file for complete search history.

(56) References Cited

U.S. PATENT DOCUMENTS 5,296,912 A * 3/1994 Strandjord ........... G01C 19/727
                                                    356/461
5,349,441 A * 9/1994 Sanders ............... G01C 19/727
                                                    356/461

(Continued)

FOREIGN PATENT DOCUMENTS

CA    2417113 A1 *    6/2002    ............. G01C 19/72
EP    3421934 A1      1/2019

OTHER PUBLICATIONS

European Patent Office, "Extended European Search Report from EP Application No. 20194200.0", from Foreign Counterpart to U.S. Appl. No. 16/566,553, filed Dec. 21, 2020, pp. 1 through 12, Published: EP.

(Continued)

*Primary Examiner* — Mohamed K Amara
(74) *Attorney, Agent, or Firm* — Fogg & Powers LLC

(57) ABSTRACT

A resonant fiber optic gyroscope (RFOG) comprises two integrated photonics interfaces coupling the optical resonator coil to the multi-frequency laser source that drives the RFOG; wherein the two integrated photonics interfaces comprise a first waveguide layer and a second waveguide layer wherein the first waveguide layer comprises two waveguide branches which come together to form a single waveguide branch; the second waveguide layer comprises two waveguide branches which remain separate from each other; and wherein the waveguide structure is configured to match an integrated photonics mode to a fiber mode supported by an optical fiber.

20 Claims, 5 Drawing Sheets

(56) References Cited

U.S. PATENT DOCUMENTS

| | | | |
|---|---|---|---|
| 6,014,217 A * | 1/2000 | Sanders | G01C 19/727 |
| | | | 356/461 |
| 8,068,231 B2 | 11/2011 | Digonnet | |
| 9,395,184 B2 | 7/2016 | Qiu et al. | |
| 10,534,136 B1 * | 1/2020 | Puckett | G02B 6/305 |
| 10,852,137 B2 * | 12/2020 | Bischel | G01C 19/721 |
| 2002/0122615 A1 * | 9/2002 | Painter | G02B 6/10 |
| | | | 385/15 |
| 2012/0051691 A1 * | 3/2012 | Zhang | G01C 19/721 |
| | | | 385/14 |
| 2015/0188659 A1 * | 7/2015 | Lipson | H04J 14/02 |
| | | | 398/44 |
| 2015/0247974 A1 * | 9/2015 | Painchaud | G02B 6/14 |
| | | | 385/14 |
| 2015/0260520 A1 | 9/2015 | Qiu et al. | |
| 2016/0356960 A1 | 12/2016 | Novack et al. | |
| 2018/0259337 A1 * | 9/2018 | Wang | G01C 19/721 |
| 2019/0003834 A1 * | 1/2019 | Sanders | G01C 19/722 |
| 2020/0116489 A1 * | 4/2020 | Wang | G02B 6/29302 |

OTHER PUBLICATIONS

Tao et al. "Improving coupling efficiency of fiber-waveguide coupling with a double-tip coupler", Optics Express, Dec. 8, 2008, pp. 1 through 6, vol. 16, No. 25, Optical Society of America.

\* cited by examiner

RESONATOR FIBER OPTIC GYROSCOPE WITH INTEGRATED PHOTONICS INTERFACE

BACKGROUND

Many resonant fiber optic gyroscopes (RFOGs) use free-space optical benches on which many of the optical components bridge the fiber resonator coil with the laser beam generators. The many discrete optical components include, but are not limited to, beam-splitters, ball lenses and half waveplates. These many discreate optical components on the free-space optical bench can increase the complexity and cost of the RFOG. However, these negative side effects are often overlooked due to the transfer efficiency between the fiber resonator coil and the beam generator provided by miniature free-space optics bench. These free-space optics allow for interfacing between the fiber resonator coil and the beam generators.

Recent advancements in integrated photonics provided a means for interfacing with fiber optics, demonstrating high degrees of robustness, resulting in reduced size, weight, and power consumption when compared to free-spaced optics. Thus, the integrated photonics platform offers a high-efficiency coupler with the ability to be applied to many different integrated photonics platforms.

SUMMARY

The Embodiments of the present invention provide methods and systems for an RFOG using at least two integrated photonics interfaces and will be understood by reading and studying the following specification.

In an example, a system is provided, the system comprising: at least two integrated photonics interfaces, each of the at least two integrated photonics interfaces having a proximal end and a distal end, each of the at least two integrated photonics interfaces having a waveguide structure including, a first waveguide layer extending from the proximal end to the distal end of the integrated photonics interface, the first waveguide layer including a first waveguide branch that extends from the proximal end to the distal end of the integrated photonics interface and a second waveguide branch that extends from the proximal end to the distal end of the integrated photonics interface, and a second waveguide layer separated from the first waveguide layer, the second waveguide layer extending from the proximal end to the distal end of the integrated photonics interface, the second waveguide layer including a including a third waveguide branch that extends from the proximal end to the distal end of the integrated photonics interface and a fourth waveguide branch that extends from the proximal end to the distal end of the integrated photonics interface; an optical resonator coil comprising a first port and a second port, wherein the first port is optically coupled to the proximal end of a first integrated photonics interface of the at least two integrated photonics interfaces and the second port is optically coupled to the proximal end of a second integrated photonics interface of the at least two integrated photonics interfaces; and wherein the waveguide structure is configured to match an integrated photonics mode to a fiber mode supported by an optical fiber.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments provide a high-efficiency fiber-to-waveguide coupler implemented in a resonator fiber-optic gyroscope (RFOG) is described herein. The fiber-to-waveguide coupler includes a multi-layer waveguide structure that matches an integrated photonics mode to the mode supported by the standard optical fiber. The on-chip design of a multi-layer waveguide structure enables ultra-high efficiency fiber-to chip transfer without many of the coupling methodologies which increase the size, cost, and points of error within a traditional RFOG.

The multi-layer photonics interface with on-chip design allows sufficiently high efficiency pass through rates. For an initial hand-off between the fiber mode to the waveguide mode, the design is theoretically simulated to be greater than about 99% and the following adiabatic transition into a single waveguide layer is theoretically simulated to be greater than about 99.9%.

The on-chip design of the multi-layer waveguide structure enables ultra-high efficiency fiber-to-chip transfer without ball lens-based coupling methodology. The on-chip waveguides direct optical signals, eliminating the need for discrete micro-optic beam splitters to steer optical signals. Furthermore, the waveguide preserves optical signal polarization, eliminating the need for discrete micro-optic polarizers, half waveplates, and Faraday rotators, and the polarization ratio can be improved further by incorporating on-chip polarizing elements into the device design. Because the chip manufacturing is based on standard, micro- and nanofabrication processes, the design can be produced quickly and relatively inexpensively.

Figure 1:
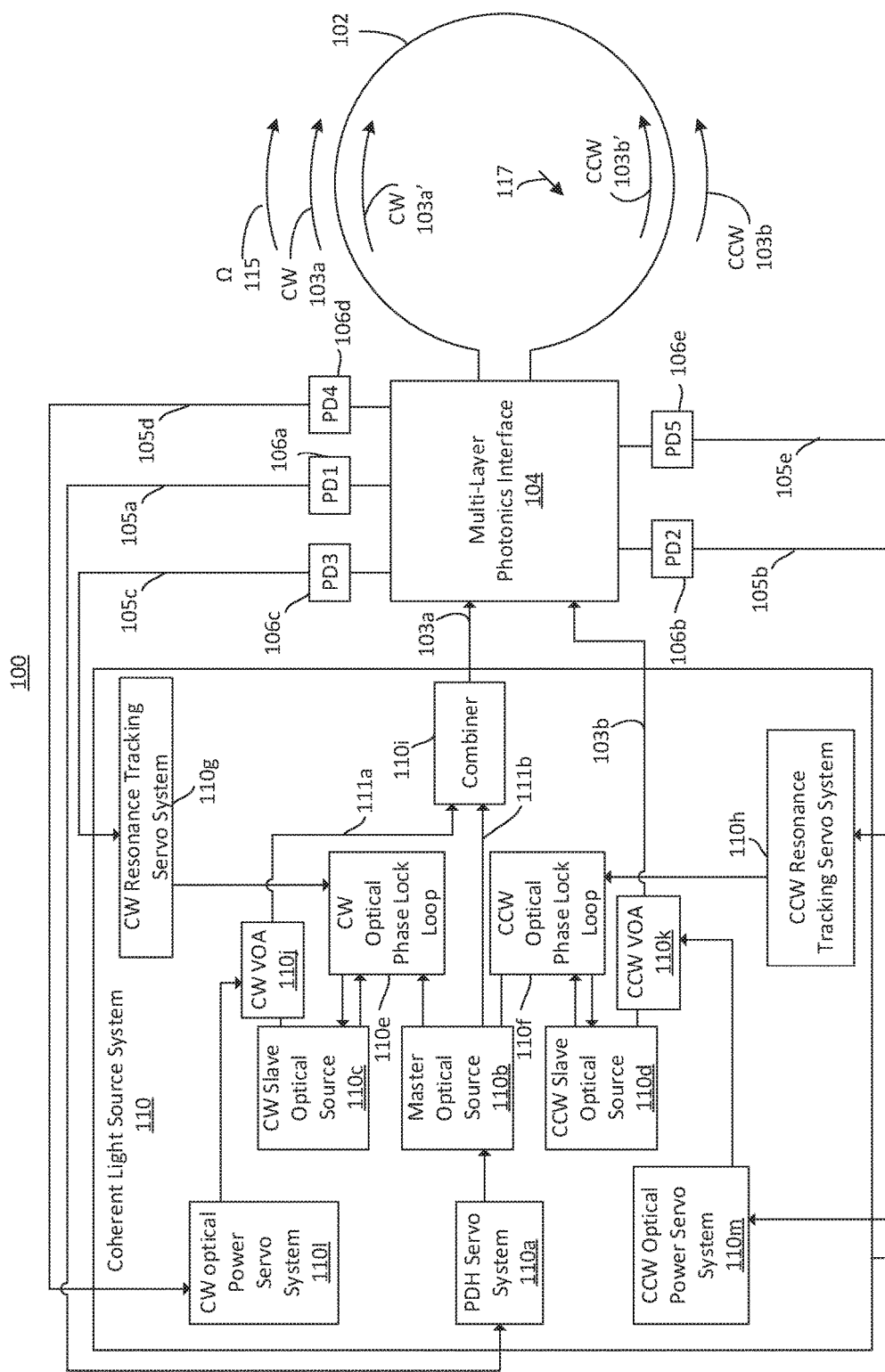
FIG. 1 is a block diagram of an exemplary embodiment of a resonant fiber optic gyroscope configured with an integrated photonics interface.

FIG. 1 illustrates a block diagram of one example embodiment of an RFOG with an integrated photonics interface 100. The embodiment of FIG. 1 is but one RFOG architecture in which the present invention can be implemented.

In the illustrated embodiment, the RFOG with an integrated photonics interface 100 includes an optical resonator coil 102, an integrated photonics interface 104, a coherent light source system 110, and a processing system 108.

The optical resonator coil 102 has a first port and a second port. The first port and the second port of the optical resonator coil 102 are coupled to the integrated photonics interface 104. The integrated photonics interface 104 includes integrated waveguides which direct optical signals through the integrated photonics interface 104. One of the integrated waveguides closes the loop of the optical resonator coil 102. Other integrated waveguides provide connections for the first port.

In one embodiment, the optical resonator coil 102 is comprised of turns or windings of optical fiber. The first photodetector 106a, the second photodetector 106b, the third photodetector 106c, the fourth photodetector 106d, the fifth photodetector 106e, and the coherent light source system 110 are coupled to the integrated photonics interface 104.

Photodetectors convert incident optical signals into electrical signals. The amplitude of the electrical signal generated by the photodetector is linearly related to the intensity of the incident optical signal.

In one embodiment, the processing system 108 is a state machine. In another embodiment, the processing system comprises a processor circuitry coupled to memory circuitry. The processing circuitry may be implemented with at least one of a microprocessor, a microcontroller, an application specific integrated circuit, and/or a gate array. The memory circuitry may be implemented by at least one of random access memory, read only memory, Flash memory, magnetic memory such as a hard drive, and/or optical memory such as an optical drive and optical disc. The processing circuitry may execute software and/or firmware stored in the memory circuitry, e.g. to determine angular rate of rotation.

The processing system 108 determines the angular rate of rotation of the optical resonator coil 102 by processing signals from the coherent light source system 110. The memory may include program instructions which are executed by the processor to determine the angular rate of rotation 115 of the optical resonator coil 102 about an input axis 117. The angular rate of rotation 115 is determined by the difference between the resonant frequencies of the optical resonator in the clockwise and counterclockwise directions. This is measured by locking the frequencies, fcw and fccw, of the clockwise (CW) slave optical signal (or first optical signal) 111a and the counter-clockwise (CCW) slave optical signals 103b (or second optical signal) to the CW and CCW resonances, respectively, of the optical resonator. Thus, the processing system 108 uses a frequency difference, $\Delta f$, between the frequency, fcw, of the CW slave optical signal and the frequency, fccw, of the CCW slave optical signal to derive the rotation rate output of the optical resonator, e.g. the RFOG with an optical processing system with optical power control. The CW optical power is controlled via photodetector 106d, CW optical Power Servo System 110i and CW VOA 110j, where photodetectors 106d is connected to the CW optical power control port of the Multi-layer Photonics Interface 104. Likewise, The CCW optical power is controlled via photodetector 106e, CCW optical Power Servo System 110m and CW VOA 110k, where photodetectors 106e is connected to the CCW optical power control port of the Multi-layer Photonics Interface 104.

In the illustrated embodiment, the first optical signal 111a is combined with a master optical signal (or second optical signal) 111b in an optical combiner (combiner) 110i prior to being coupled to the integrated photonics system 104, and then to the optical resonator coil 102. The CCW slave optical signal 103b is also coupled to the integrated photonics system 104 and the optical resonator coil 102. Signals representative of fccw and fcw are respectively provided by a CCW resonance tracking servo system 110h and a CW resonance tracking servo system 110g in the coherent light source system 110. The angular rate of rotation 115 about the input axis 117 is an angular rate of rotation, $\Omega$, 115 where $\Omega = (\lambda * \Delta f * P)/(4 * A)$, $\lambda$ is substantially equal to the average wavelength of the clockwise optical signal 103a and the counter-clockwise light signal 103b. Further, A is the area enclosed by the optical resonator coil 102 and P is the perimeter of the optical resonator path of the optical resonator coil 102 and the multi-layer photonics interface 104, optically connecting light between two fiber ends of coil 102.

The coherent light source system 110 generates a clockwise (CW) optical signal 103a and counter-clockwise (CCW) optical signal 103b which are coupled to the optical resonator coil 102 by the integrated photonics system 104. In one embodiment, the CW optical signal 103a and the CCW optical signal 103b are linearly polarized. In another embodiment, the linearly polarized CW optical signal 103a and the linearly polarized CCW optical signal 103b are each substantially linearly polarized in one direction, e.g. horizontal or vertical, or P or S polarized. The direction of polarization is ideally the same for the linearly polarized CW optical signal 103a and the linearly polarized CCW optical signal 103b. Polarized CW optical signal 103a' and polarized CCW optical signal 103b' propagate respectively clockwise and counter-clockwise around the optical resonator coil 102.

The integrated photonics system 104 transfers optical feedback signals which are converted to electrical feedback signals by the first photodetector 106a, the second photodetector 106b, the third photodetector 106c, the fourth photodetector 106d, and the fifth photodetector 106e. The first photodetector 106a, the second photodetector 106b, the third photodetector 106c, the fourth photodetector 106d, and the fifth photodetector 106e respectively generate a first feedback signal 105a, a second feedback signal 105b, a third feedback signal 105c, a fourth feedback signal 105d, and a fifth feedback signal 105e which are coupled to the coherent light source system 110.

In the illustrated embodiment, the coherent light source system 110 comprises a PDH servo system 110a, a CW slave optical source 110c, a master optical source 110b, a CCW slave optical source 110d, a CW resonance tracking servo 110g, a CW optical phase lock loop 110e, a CCW optical phase lock loop 110f, a CCW resonance tracking servo system 110h, an optical combiner (combiner) 110i, a CW optical power servo system 110l, a CCW optical power servo system 110m, a CW variable optical attenuator (VOA) 110j, and a CCW VOA 110k. The PDH servo system 110a is configured to receive a first feedback signal 105a, and is coupled to the master optical source 110b and the first photodetector 106a.

The CW resonance tracking servo 110g is configured to receive the third feedback signal 105c, and is coupled to the CW optical phase lock loop 110e and the third photodetector 106c. The CW optical phase lock loop 110e is coupled to the CW slave optical source 110c and the master optical source 110b. The CCW resonance tracking servo system 110h is configured to receive the second feedback signal 105b, and is coupled to the CCW optical phase lock loop 110f and the second photodetector 106b. The CCW optical phase lock loop 110f is coupled to the CCW slave optical source 110d and the master optical source 110b.

The CW optical power servo system 110l is configured to receive the fourth feedback signal 105d, and is coupled to the CW VOA 110j and the fourth photodetector 106d. The CCW optical power servo system 110m is configured to receive the fifth feedback signal 105e, and is coupled to the CCW VOA 110k. The fourth photodetector 106d and the fifth photodetector 106e receive respectively a portion of the CW optical signal 103a' and a portion of the CCW optical signal 103b' circulating in the optical resonator, and convert such optical signals respectively to electrical signals, respectively the fourth feedback signal 105d and the fifth feedback signal 105e. The amplitude of the fourth feedback signal 105d and the fifth feedback signal 105e is indicative of the power levels of respectively the CW optical signal 103a' and the CCW optical signal 103b'. The fourth feedback signal 105d and the fifth feedback signal 105e are respectively received by the CW optical power servo system 110l and the CCW optical power servo system 110m. The CW optical power servo system 110l and the CCW optical power servo system 110m are electrical circuits configured to generate electrical signals to control the attenuation of respectively the CW VOA 110j and the CCW VOA 110k to maintain a constant power level of the CW optical signal 103a' and the CCW optical signal 103b' propagating in the optical resonator 102. Although, a variable optical attenuator is illustrated for pedagogical purposes herein, other devices such as a variable gain optical amplifier can be used in lieu of a variable optical attenuator.

The optical combiner 110i combines a first optical signal 111a emitted from the CW slave optical source 110c and a second optical signal 111b emitted from the master optical source 110b, and forms the CW optical signal 103a. The CCW slave optical source 110d generates the CCW optical signal 103b.

The first feedback signal 105a and the PDH servo system 110a lock the carrier frequency of the second optical signal 111b emitted by the master optical source 110b to a longitudinal resonant frequency or to a frequency that is offset from a longitudinal resonant frequency of the optical resonator by a fixed frequency (offset frequency). The longitudinal resonant frequency equals q multiplied by a free spectral range (FSR) of the optical resonator, where q is an integer. In some embodiments, the carrier frequency of the second optical signal 111b is locked to q times FSR, or in some embodiments it is locked to $(q+\frac{1}{2})$*FSR. The difference between the longitudinal resonance frequency (or resonance frequency) and the corresponding carrier frequency is the frequency offset.

The third feedback signal 105c and the CW resonance tracking servo system 110g and the CW optical phase lock loop 110e lock the carrier frequency of the first optical signal 111a emitted by the CW slave optical source 110c to a resonant frequency or to a frequency that is offset from a CW resonant frequency of the optical resonator by a fixed offset frequency. The CW resonant frequency equals p multiplied by a free spectral range (FSR) of the optical resonator, where p is an integer. In some embodiments, the carrier frequency of the first optical signal 111a is locked to p times FSR, or in some embodiments it is locked to $(p+\frac{1}{2})$*FSR.

The second feedback signal 105b, the CCW resonance tracking servo system 110h, and CCW optical phase lock loop 110f lock the carrier frequency of the CCW optical signal 103b emitted by the CCW slave optical source 110d to a resonant frequency or to a frequency that is offset from a CCW resonant frequency of the optical resonator by a fixed offset frequency. The CCW resonant frequency equals m multiplied by a free spectral range (FSR) of the optical resonator, where m is an integer. In some embodiments, the carrier frequency of the CCW optical signal 103b is locked to m times FSR, or in some embodiments it is locked to $(m+\frac{1}{2})$*FSR. In one embodiment, q, p, and m are different integer numbers.

When the CW and CCW carrier frequencies are both locked to offset frequencies, the frequency offsets from optical resonator resonant frequencies are substantially equal; hence, the difference between the carrier frequencies of the first optical signal 111a and the CCW optical signal 103b are equal to $\Delta f$ as described above, and rotation rate can be derived from $\Delta f$ as described above.

In one embodiment, the frequency offsets of the first optical signal 111a and the CCW optical signal 103b are substantially zero frequency. In another embodiment, each frequency offset is substantially one half of a free spectral range of the optical resonator. In all embodiments, the first optical signal 111a, the second optical signal 111b, and CCW optical signal 103b are frequency modulated, e.g. by frequency modulating respectively the CW slave optical source 110c, the master optical source 110b, and the CCW slave optical source 110d, to determine optical resonator resonant frequencies. In one embodiment, modulation frequencies for the CW slave optical source 110c, the master optical source 110b, and the CCW slave optical source 110d are all different, so that the CCW resonance tracking servo system 110h, the CW resonance tracking servo system 110g, and the PDH servo system 110a may distinguish detected optical signals from each of the CW slave optical source 110c, the master optical source 110b, and the CCW slave optical source 110d. The frequency modulation causes each of the first optical signal 111a, the second optical signal 111b, and the CCW optical signal 103b to have a spectrum of frequencies centered about a corresponding carrier frequency.

In embodiments where the carrier frequencies of the first optical signal 111a and the CCW optical signal 103b, respectively emitted by the CW slave optical source 110c and the CCW slave optical source 110d, are locked to a frequency offset of substantially one half free spectral range from a resonant frequency of the optical resonator in the CW and CCW directions respectively, the odd sidebands of the CW slave optical source 110c and the CCW slave optical source 110d are locked onto resonant frequencies in the CW and CCW directions respectively. This condition is substantially the same for measuring rotation rate as the case of locking CW and CCW slave optical source carrier frequencies to CW and CCW resonant frequencies of the optical resonator.

In one embodiment, the carrier frequencies of first optical signal 111a, the second optical signal 111b, and the CCW optical signal 103b are controlled as follows. The carrier frequency of the second optical signal 111b is locked to a resonance or an offset frequency corresponding to the CW direction of the optical resonator as shown in FIG. 1. The photodetector PD1 106a detects an incident optical signal, and generates the corresponding first feedback 105a which is provided to the PDH servo system 110a. The PDH servo system 110a is responsive to a frequency component in first feedback signal 105a that is related to the frequency of modulation applied to the carrier frequency of the master optical source 110b. Portions of the second optical signal 111b, emitted by the master optical source 110b, are respectively coupled to the CW optical phase lock loop 110e and the CCW optical phase lock loop 110f. A portion of the first optical signal 111a, emitted by the CW slave optical source 110c, and a portion of the CCW optical signal 103b, emitted by the CCW slave optical source 110d, are respectively coupled to the CW optical phase lock loop 110e and the CCW optical phase lock loop 110f. The carrier frequency of the first optical signal 111a is locked to the carrier frequency of the second optical signal 111b within a tunable difference frequency of f1 by the CW optical phase lock loop 110e. The carrier frequency of the CCW optical signal is locked to the master carrier frequency within a tunable difference frequency of f2 by the CCW optical phase lock loop 110f. A tunable difference frequency is a frequency within the tuning range of the corresponding servo system. The CW resonance tracking servo system 110g and the CCW resonance tracking servo system 110h control tunable difference frequencies f1 and f2 so that the carrier frequency of the first optical signal 111a is locked to the CW resonance of the optical resonator (or at a frequency offset of substantially one half free spectral range from it) and the carrier frequency of the CCW optical signal 103b is locked to the CCW resonance of the optical resonator (or to a frequency offset of substantially one half free spectral range from it). The tunable difference frequencies f1 and f2 are controlled such that the desirable offset of the CW and CCW carrier frequencies from resonance (e.g., substantially zero or substantially one half free spectral range) are maintained during rotation rate changes, and changing environmental conditions, e.g. temperature and vibrations, that can cause the optical resonator resonances to shift over time.

As shown in FIG. 1, the first optical signal 111a emitted from the CW slave optical source 110c and the second optical signal 111b emitted from the master optical source 110b are combined in optical combiner 110i prior to being coupled to the integrated photonics system 104. Optical combiner 110i may be a bulk optic beam splitter, or a fiber optical direction coupler, or another waveguide directional optical coupler.

In one embodiment, the master optical source 110b, the CW slave optical source 110c and the CCW slave optical source 110d each respectively comprise a LASER. Each optical source may include two or more optical outputs provided, e.g., to the optical resonator and optical phase lock loop(s) and implemented with an optical splitter. One or more optical sources may include a phase modulator to frequency modulate respective LASER(s). One or more optical sources may include intensity (or amplitude) modulators to compensate for phase modulation to amplitude modulation noise in phase modulator(s), to equalize the amplitude levels of the baseband component emitted by the slave optical sources, and to stabilize the second optical signal 111b emitted by the master optical source 110b. Each optical source may include optical isolators to prevent leakage of undesired signal into such sources. In another embodiment, the PDH servo system 110a, the CW resonance tracking servo system 110g, and the CCW resonance tracking servo system 110h are respectively implemented with electronic circuitry.

The coherent light source system 110, or components therein, may include components not shown in FIG. 1. Such components may be used to amplitude and phase modulate optical signals, and to amplify or split optical signals. In one embodiment, such components include variable optical attenuator(s), intensity modulator(s), phase modulator(s), optical amplifier(s), optical isolator(s), and optical passive device(s).

Figure 2:
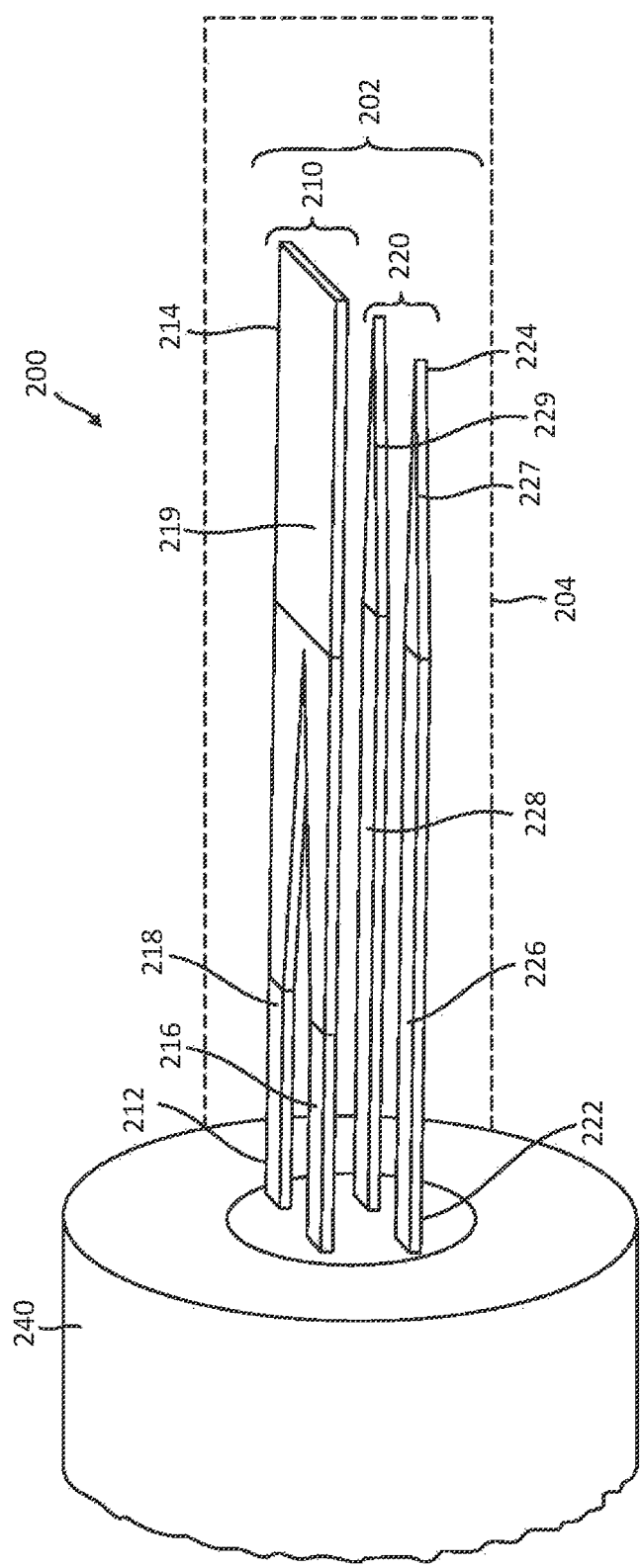
FIG. 2 is a perspective side view of a fiber-to-waveguide optical coupler, according to one embodiment.

FIG. 2 illustrates a detailed view of a fiber-to-waveguide optical coupler 200 further exemplified in application Ser. No. 16/223,548. In some embodiments, the integrated photonics interface shares similar structural anatomy to the fiber-to-waveguide optical coupler. The optical coupler 200 comprises a waveguide structure 202 surrounded by and embedded in a cladding 204. The waveguide structure 202 includes a first waveguide layer 210, and a second waveguide layer 220 separated from the first waveguide layer 210 by a predetermined distance. In some embodiments, more than two waveguide layers may be used, with each subsequent waveguide using either the structure of the first waveguide layer 210 or the structure of the second waveguide layer 220 as described below.

The first waveguide layer 210 has a proximal end 212 and a distal end 214. The first waveguide layer 210 includes a first pair of waveguides 216, 218 that extend from the proximal end 212 along a first portion of the first waveguide layer 210. The first pair of waveguides 216, 218 each widen along a second portion of the first waveguide layer 210 such that the first pair of waveguides 216, 218, merge into a single waveguide 219 toward the distal end 214.

The second waveguide layer 220 has a proximal end 222 and a distal end 224. The second waveguide layer 220 includes a second pair of waveguides 226, 228 that extend from the proximal end 222 along a first portion of the second waveguide layer 220. The second pair of waveguides 226, 228 each narrow along a second portion of the second waveguide layer 220 to respective distal tips 227, 229 at the distal end 224.

The waveguide structure 220 is configured to couple an optical fiber 240 to an integrated photonics platform, such that an integrated photonics mode is matched to a fiber mode supported by an optical fiber 240.

The first and second waveguide layers 210, 220 can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobite (LiNbO$_3$), titanium dioxide (TiO$_2$), or combinations thereof.

The cladding 204 can be composed of various lower index materials, such as silicon dioxide (SiO$_2$), silicon oxynitride (SiON), zinc oxide (ZnO) (used with Si waveguide or other similarly high index waveguide), aluminum oxide (Al$_2$O$_3$), calcium fluoride (CaF$_2$), or combinations thereof.

The first pair of waveguides 216, 218 can each have a thickness of about 25 nm to about 100 nm, and the second pair of waveguides 226, 228 can each have a thickness of about 25 nm to about 100 nm.

Figure 2A:
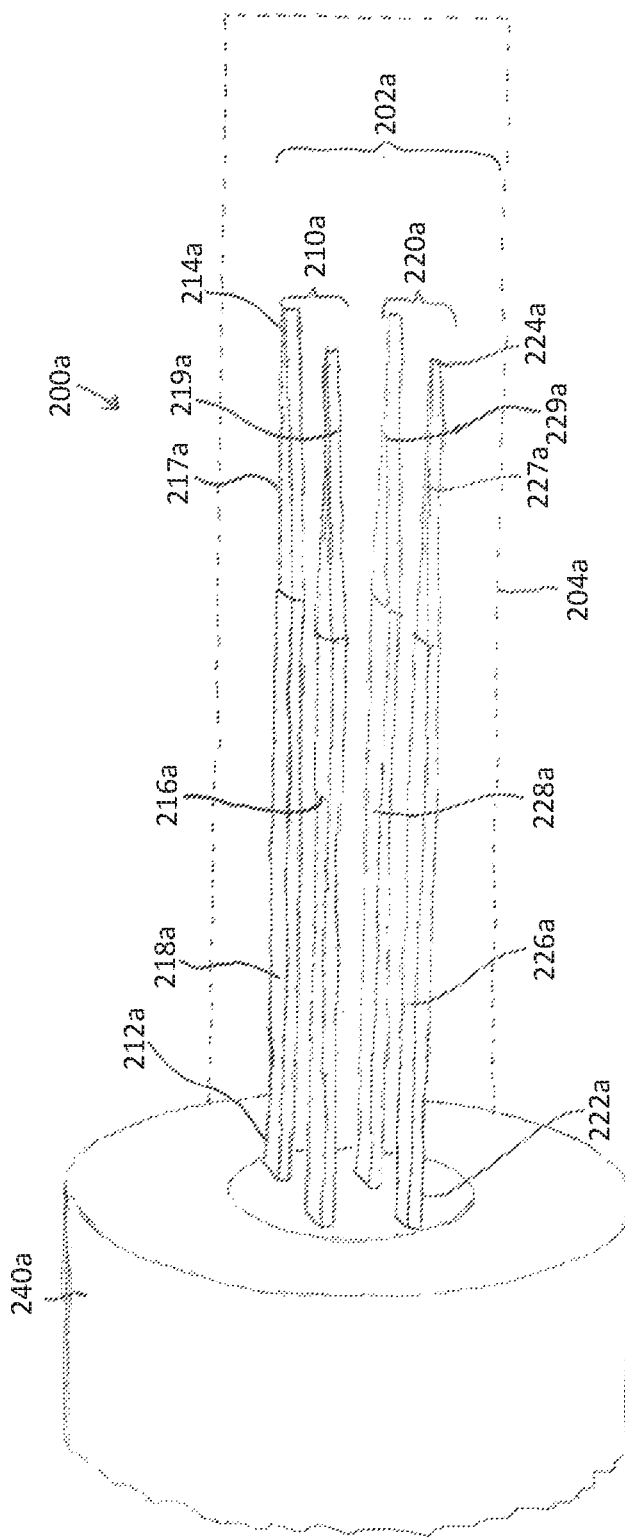
FIG. 2a is a perspective side view of a fiber-to-waveguide optical coupler, according to one embodiment.

FIG. 2a illustrates a detailed view of a fiber-to-waveguide optical coupler 200a. In some embodiments, the integrated photonics interface shares similar structural anatomy to the fiber-to-waveguide optical coupler. The optical coupler 200a comprises a waveguide structure 202a surrounded by and embedded in a cladding 204a. The waveguide structure 202a includes a first waveguide layer 210a, and a second waveguide layer 220a separated from the first waveguide layer 210a by a predetermined distance.

The first waveguide layer 210a has a proximal end 212a and a distal end 214a. The first waveguide layer 210a includes a first pair of waveguides 216a, 218a that extend from the proximal end 212a along a first portion of the first waveguide layer 210a. In some embodiments, the first pair of waveguides 216a, 218a each narrow along a second portion of the first waveguide layer 210a to respective distal tips 217a, 219a at the distal end 214a.

The second waveguide layer 220a has a proximal end 222a and a distal end 224a. The second waveguide layer 220a includes a second pair of waveguides 226a, 228a that extend from the proximal end 222a along a first portion of the second waveguide layer 220a. In some embodiments, the second pair of waveguides 226a, 228a each narrow along a second portion of the second waveguide layer 220a to respective distal tips 227a, 229a at the distal end 224a.

The waveguide structure 220a is configured to couple an optical fiber 240a to an integrated photonics platform, such that an integrated photonics mode is matched to a fiber mode supported by an optical fiber 240a.

In some embodiments, the first pair of waveguides 216a, 218a and the second pair of waveguides 226a, 228a do not narrow along the second portion of the respective waveguide layers 210a, 220a. In some embodiments, the first pair of waveguides 216a, 218a comprise a first pair of waveguides for a second fiber-to-waveguide optical coupler. Similarly, the second pair of waveguides 226a, 228a comprise a second pair of waveguides for a second optical coupler. At the distal end 214a, the first pair of waveguides 216a couple to a second optical fiber opposite the optical fiber 240a. Similarly, at the distal end 224a, the second pair of waveguides 226a couple to the second optical fiber opposite the optical fiber 240a. Thus, the optical fiber 240a and the second optical fiber optically couple along the first pair of waveguides 216a, 218a and the second pair of waveguides 226a, 228a. The two fiber-to-waveguide optical couplers share the first waveguide layer 210a and the second waveguide layer 220a.

The first and second waveguide layers 210a, 220a can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobite (LiNbO₃), titanium dioxide (TiO₂), or combinations thereof.

The cladding 204a can be composed of various lower index materials, such as silicon dioxide (SiO₂), silicon oxynitride (SiON), zinc oxide (ZnO) (used with Si waveguide or other similarly high index waveguide), aluminum oxide (Al₂O₃), calcium fluoride (CaF₂), or combinations thereof.

The first pair of waveguides 216a, 218a can each have a thickness of about 25 nm to about 100 nm, and the second pair of waveguides 226a, 228a can each have a thickness of about 25 nm to about 100 nm.

Figure 3:
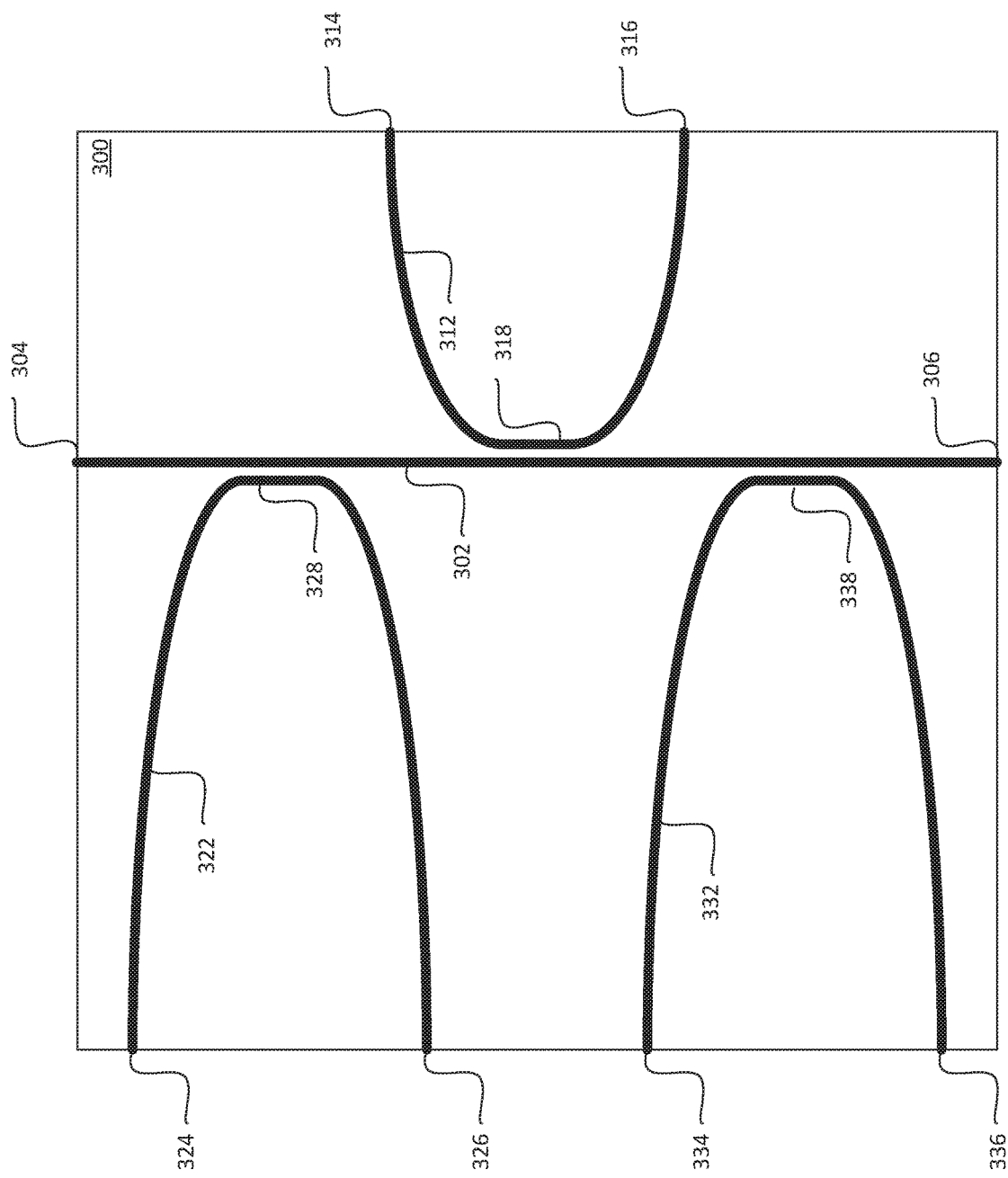
FIG. 3 is a graphical representation of an integrated photonics interface according to one embodiment.

FIG. 3 is an example graphical representation of an integrated photonics interface 300. In the example, the integrated photonics interface 300 comprises four waveguides: a first waveguide 302, a second waveguide 312, a third waveguide 322, and a fourth waveguide 332 integrated into one or more layers of the integrated photonics interface 300. The integrated photonics interface 300 can be a multilayer photonics interface where each layer comprises one or more waveguides. The orientation and scale of the waveguides on the integrated photonics interface are scaled to exemplify the features of the device, and should not be considered the actual orientation of the waveguides within the integrated photonics interface 300. In some examples, the waveguides comprise a high index optically transmissive material.

In the example, the first waveguide 302 comprises a first port 304 and a second port 306. The waveguides of the integrated photonics interface 300 are configured to preserve the optical signal polarization and to guide the optical signal with little signal loss. In the example, the first port 304 and the second port 306 of the first waveguide 302 optically couple to an optical resonator coil, a fiber resonator coil, or another type of resonator. The optical couplings at the first port 304 and the second port 306 of the first waveguide 302 are configured preserve the signal polarization and preserve greater than 99% of the signal. In some examples, connections at the first port 304 and the second port 306 comprise an integrated photonics interface as depicted in FIG. 2.

In the example, the second waveguide 312 comprises a first port 314 and a second port 316. In the example, the first port 314 and the second port 316 of the second waveguide 312 are a first beam transmission port and a second beam transmission port respectively. In some examples, the first port 314 and the second port 316 of the second waveguide 312 each optically couple to one or more photodetectors within an RFOG. In the example given in FIG. 1, the first port 314 couples to the second photodetector 106b and the second port 316 couples to the third photodetector 106c. The second waveguide 312 is configured to be optically coupled 318 to the first waveguide 302. The optical coupling 318 is configured to allow a portion of the light transmitted through the first waveguide 302 through to the second waveguide 312. In some examples, connections at the first port 314 and the second port 316 comprise an integrated photonics interface as depicted in FIG. 2.

In the example, the third waveguide 322 comprises a first port 324 and a second port 326. In the example, the first port 324 and the second port 326 of the third waveguide 322 are a first beam reflection port and a Multi-frequency laser source port respectively and optically couple to the Multi-frequency laser source. In some examples, the first port 324 of the third waveguide 322 each optically couples to a photodetector within an RFOG. The third waveguide 322 is configured to be optically coupled 328 to the first waveguide 302. The optical coupling 328 is configured to allow a portion of the light transmitted through the third waveguide 322 through to the first waveguide 302 and thus the attached resonator coil. In some examples, connections at the first port 324 and the second port 326 comprise an integrated photonics interface as depicted in FIG. 2.

In the example, the fourth waveguide 332 comprises a first port 334 and a second port 336. In the example, the first port 334 and the second port 336 of the fourth waveguide 332 are a Multi-frequency laser source port and a second beam reflection port respectively and optically couple to the Multi-frequency laser source. In some examples, the second port 336 of the fourth waveguide 332 each optically couples to a photodetector within an RFOG. The fourth waveguide 332 is configured to be optically coupled 338 to the first waveguide 302. The optical coupling 338 is configured to allow a portion of the light transmitted through the third waveguide 332 through to the first waveguide 302 and thus the attached resonator coil. In some examples, connections at the first port 334 and the second port 336 comprise an integrated photonics interface as depicted in FIG. 2.

The waveguides 302, 312, 322, 332 of the integrated photonics interface 300 can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobite (LiNbO$_3$), titanium dioxide (TiO$_2$), or combinations thereof.

The waveguides 302, 312, 322, 332 of the integrated photonics interface 300 can each have a thickness of about 25 nm to about 100 nm, and the second pair of waveguides 226, 228 can each have a thickness of about 25 nm to about 100 nm.

Figure 4:
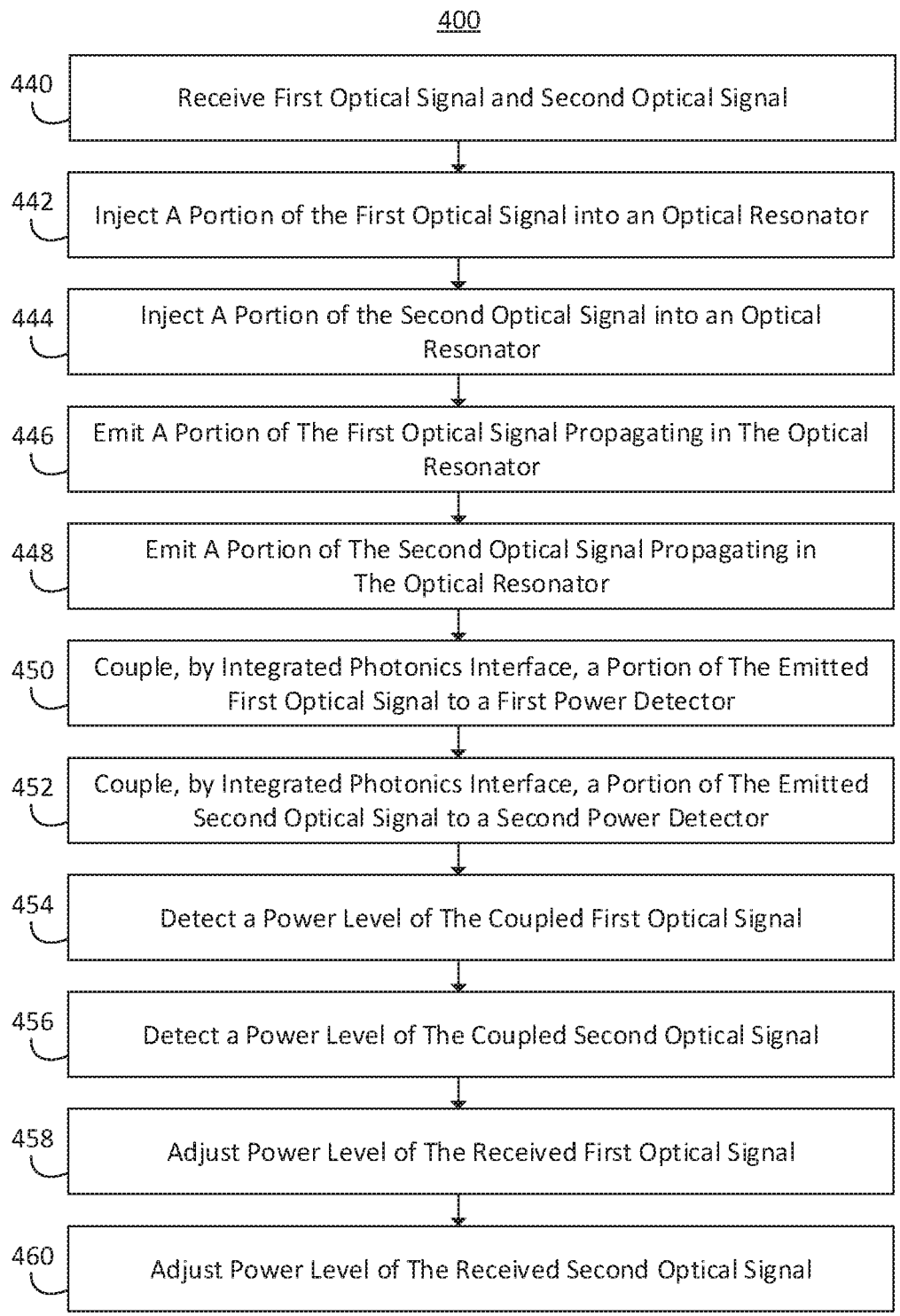
FIG. 4 illustrates an exemplary method of operating a resonant fiber optic gyroscope with an integrated photonics interface.

FIG. 4 illustrates an exemplary method 400 of operating an RFOG with an integrated photonics interface. To the extent the method 400 shown in FIG. 4 is described as being implemented in the system shown in FIG. 1 and FIG. 3, it is to be understood that other embodiments can be implemented in other ways. The blocks of the flow diagram have been arranged in a generally sequential manner for ease of explanation; however, it is to be understood that this arrangement is merely exemplary, and it should be recognized that the processing associated with the methods (and the blocks shown in the figures) can occur in a different order (for example, where at least some of the processing associated with the blocks is performed in parallel and/or in an event-driven manner).

In block 440, receive at an integrated photonics interface a first optical signal and a second optical signal, e.g. from the coherent light source system 110. The first optical signal and the second optical signal are received at separate waveguides within the integrated photonics interface. In some examples, the waveguides are on the same layer of the integrated photonics interface, in other examples, the waveguides are on separate layers.

In block 442, inject a portion of the first optical signal into a first waveguide within the integrated photonics interface, the first waveguide optically coupled to an optical resonator, so that the first optical signal propagates in a first direction through the optical resonator. In block 444, inject a portion of the second optical signal into the first waveguide within the integrated photonics interface so that the second optical signal propagates in a second direction through the optical resonator which is opposite to the first direction.

In block 446, emit a portion of the first optical signal propagating in the first direction in the optical resonator. In block 448, emit a portion of the second optical signal propagating in the second direction in the optical resonator. In block 450, couple, by the integrated photonics interface, a portion of the emitted first optical signal to a first power detector. In block 452, couple, by the integrated photonics interface, a portion of the emitted second optical signal to a second power detector. In block 454, detect, with the first power detector, a power level of at least a portion of the coupled first optical signal. In block 456, detect, with the second power detector, a power level of at least a portion of the coupled second optical signal. In block 458, adjust the power level of the received first optical signal. In block 460, adjust the power level of the received second optical signal.

Exemplary Embodiments

Example 1 includes system comprising: at least two integrated photonics interfaces, each of the at least two integrated photonics interfaces having a proximal end and a distal end, each of the at least two integrated photonics interfaces having a waveguide structure including, a first waveguide layer extending from the proximal end to the distal end of the integrated photonics interface, the first waveguide layer including a first waveguide branch that extends from the proximal end to the distal end of the integrated photonics interface and a second waveguide branch that extends from the proximal end to the distal end of the integrated photonics interface, and a second waveguide layer separated from the first waveguide layer, the second waveguide layer extending from the proximal end to the distal end of the integrated photonics interface, the second waveguide layer including a including a third waveguide branch that extends from the proximal end to the distal end of the integrated photonics interface and a fourth waveguide branch that extends from the proximal end to the distal end of the integrated photonics interface; an optical resonator coil comprising a first port and a second port, wherein the first port is optically coupled to the proximal end of a first integrated photonics interface of the at least two integrated photonics interfaces and the second port is optically coupled to the proximal end of a second integrated photonics interface of the at least two integrated photonics interfaces; and wherein the waveguide structure is configured to match an integrated photonics mode to a fiber mode supported by an optical fiber.

Example 2 includes the system of Example 1, wherein the first waveguide branch of the first waveguide layer and the second waveguide branch of the first waveguide layer converge at the distal end of the integrated photonics interface.

Example 3 includes the system of Examples 1-2, wherein the distal end of the first integrated photonics interface is coupled to the distal end of the second integrated photonics interface to form a first waveguide.

Example 4 includes the system of Examples 1-3, wherein the first waveguide layer and the second waveguide layer of at least one of the at least two integrated photonics interfaces comprise a high index optically transmissive material.

Example 5 includes the system of Examples 1-4, wherein the first waveguide layer and the second waveguide layer of the at least one of the at least two integrated photonics interfaces comprise silicon, silicon nitride, silicon oxynitride, silicon carbide, diamond, silicon germanium, germanium, gallium arsenide, gallium nitride, gallium phosphide, lithium niobite, titanium dioxide, or combinations thereof.

Example 6 includes the system of Examples 1-5, wherein the distal end of the first integrated photonics interface is coupled to the distal end of the second photonics interface.

Example 7 includes the system of Examples 1-6, wherein the first waveguide layer and the second waveguide layer of at least one of the at least two integrated photonics interfaces have a thickness of about 25 nm to about 100 nm.

Example 8 includes the system of Examples 1-7, wherein the first waveguide layer and the second waveguide layer of the at least one of the at least two integrated photonics interfaces are separated by a distance of about 2.5 μm to about 3.5 μm.

Example 9 includes the system of Example 1-8, wherein the first waveguide layer and the second waveguide layer of at least one of the at least two integrated photonics interfaces are embedded in a cladding.

Example 10 includes the system of Example 9, wherein the cladding comprises a low index material.

Example 11 includes the system of Examples 9-10, wherein the cladding comprises silicon dioxide, silicon oxynitride, zinc oxide, aluminum oxide, calcium fluoride, or combinations thereof.

Example 12 includes the system of Example 3-11, further comprising: a second waveguide including, a third integrated photonics interface, a fourth integrated photonics interface that is optically coupled between a distal end of the third integrated photonics interface and a distal end of the fourth integrated photonics interface; wherein the second waveguide is optically coupled to the first waveguide; a third optical waveguide including, a fifth integrated photonics interface, a sixth integrated photonics interface that is optically coupled between a distal end of the fifth integrated photonics interface and a distal end of the sixth integrated photonics interface; wherein the third waveguide is optically coupled to the first waveguide; a fourth optical waveguide including, a seventh integrated photonics interface, an eighth integrated photonics interface that is optically coupled between a distal end of the seventh integrated photonics interface and a distal end of the eighth integrated photonics interface; and wherein the fourth waveguide is optically coupled to the first waveguide.

Example 13 includes the system of Example 12, wherein the fifth integrated photonics interface is optically coupled to a multi-frequency laser source; and wherein the seventh integrated photonics interface is optically coupled to the multi-frequency laser source.

Example 14 includes a system comprising: at least two integrated photonics interfaces, each of the at least two integrated photonics interfaces having a proximal end and a distal end, each of the at least two integrated photonics interfaces having a waveguide structure including, at least two waveguide layers, each waveguide layer extending from the proximal end to the distal end of the integrated photonics interface, the first waveguide layer including a first waveguide branch that extends from the proximal end to the distal end of the integrated photonics interface and a second waveguide branch that extends from the proximal end to the distal end of the integrated photonics interface; an optical resonator coil comprising a first port and a second port, wherein the first port is optically coupled to the proximal end of a first integrated photonics interface of the at least two integrated photonics interfaces and the second port is optically coupled to the proximal end of a second integrated photonics interface of the at least two integrated photonics interfaces; and wherein the waveguide structure is configured to match an integrated photonics mode to a fiber mode supported by an optical fiber.

Example 15 includes the system of Example 14, wherein the first waveguide branch of the first waveguide layer and the second waveguide branch of the first waveguide layer converge at the distal end of the integrated photonics interface.

Example 16 includes the system of Examples 14-15, wherein the each of at least two waveguide layers of the at least two integrated photonics interfaces are separated from each other layer by a distance of about 2.5 µm to about 3.5 µm.

Example 17 includes a method, comprising: receiving a first optical signal and a second optical signal; communicating a portion of the first optical signal into an optical resonator through a first integrated photonics interface so that the portion of the first optical signal propagates in a first direction through the optical resonator; communicating a portion of the second optical signal into the optical resonator through a second integrated photonics interface so that the portion of the second optical signal propagates in a second direction through the optical resonator, which is opposite the first direction; wherein each of the first integrated photonics interface and the second integrated photonics interface has a proximal end and a distal end, each of the first integrated photonics interface and the second of the integrated photonics interface including at least two waveguide layers extending between the proximal end and a distal end of the integrated photonics interface, the first waveguide layer including a first waveguide branch that extends from the proximal end to the distal end of the integrated photonics interface and a second waveguide branch that extends from the proximal end to the distal end of the integrated photonics interface; emitting a portion of the first optical signal propagating in the first direction in the optical resonator; and emitting a portion of the second optical signal propagating in the second direction in the optical resonator.

Example 18 includes the method of Example 17, wherein the first waveguide branch of the first waveguide layer and the second waveguide branch of the first waveguide layer couple at the distal end.

Example 19 includes the method of Examples 17-18, wherein the first integrated photonics interface and the second integrated photonics interface are on a multi-layer photonics chip.

Example 20 includes the method of Examples 17-19 wherein the multi-layer photonics chip comprises on-chip routing architecture.

What is claimed is:

1. A system comprising: an integrated photonics interface including at least two waveguide optical couplers, each of the at least two waveguide optical couplers having a proximal end and a distal end, each of the at least two waveguide optical couplers having a waveguide structure including, a first waveguide layer extending from the proximal end to the distal end of the integrated photonics interface, the first wave guide layer including a first wave guide branch that extends from the proximal end to the distal end of the integrated photonics interface and a second waveguide branch that extends from the proximal end to the distal end of the wave guide optical coupler, and a second waveguide layer separated from the first wave guide layer, the second wave guide layer extending from the proximal end to the distal end of the integrated photonics interface, the second waveguide layer including a third waveguide branch that extends from the proximal end to the distal end of the integrated photonics interface and a fourth waveguide branch that extends from the proximal end to the distal end of the wave guide optical coupler; an optical resonator coil comprising a first port and a second port, wherein the first port is optically coupled to the proximal end of a first waveguide optical coupler of the at least two wave guide optical couplers and the second port is optically coupled to the proximal end of a second waveguide optical coupler of the at least two wave guide optical couplers, the distal end of the first wave guide layer of the first wave guide optical coupler being optically coupled to the distal end of the first waveguide layer of the second wave guide optical coupler and the second waveguide layer of the first waveguide optical coupler is optically coupled to the distal end of the second waveguide layer of the second wave guide optical coupler to form wave guides in the integrated photonics interface; and wherein the wave guide structure is configured to match an integrated photonics mode to a fiber mode supported by an optical fiber.

2. The system of claim 1, wherein the first waveguide branch of the first waveguide layer and the second waveguide branch of the first waveguide layer converge at the distal end of the at least two integrated photonics interfaces.

3. The system of claim 1, wherein each of the first and second waveguide layers of the first and second waveguide optical coupler form at least one first waveguide in the integrated photonics interface.

4. The system of claim 3, further comprising:
 a second waveguide formed in the integrated photonics interface including,
  a third waveguide optical coupler,
  a fourth waveguide optical coupler that is optically coupled between a distal end of the third waveguide optical coupler and a distal end of the fourth integrated photonics waveguide optical coupler;
wherein the second waveguide is optically coupled to the first waveguide;
a third optical waveguide formed in the integrated photonics interface including,
a fifth waveguide optical coupler,
a sixth waveguide optical coupler that is optically coupled between a distal end of the fifth waveguide optical coupler and a distal end of the sixth integrated photonics waveguide optical coupler;
wherein the third waveguide is optically coupled to the first waveguide;
a fourth optical waveguide formed in the integrated photonics interface including, a seventh waveguide optical coupler, an eighth waveguide optical coupler that is optically coupled between a distal end of the seventh waveguide optical coupler and a distal end of the eighth waveguide optical coupler; and
wherein the fourth waveguide is optically coupled to the first waveguide.

5. The system of claim 4, wherein the fifth waveguide optical coupler is optically couple to a multi-frequency laser source; and
wherein the seventh waveguide optical coupler is optically coupled to the multi-frequency laser source.

6. The system of claim 1, wherein the first waveguide layer and the second waveguide layer of the at least one of at least two integrated photonics interfaces comprise a high index optically transmissive material.

7. The system of claim 1, wherein the first waveguide layer and the second waveguide layer of the at least one of the at least two integrated photonics interfaces comprise silicon, silicon nitride, silicon oxynitride, silicon carbide, diamond, silicon germanium, germanium, gallium arsenide, gallium nitride, gallium phosphide, lithium niobite, titanium dioxide, or combinations thereof.

8. The system of claim 1, wherein the distal end of the first waveguide branch and the second waveguide branch of the first waveguide layer of the first waveguide optical coupler is optically coupled to the distal end of the first waveguide branch and the second waveguide branch of the first waveguide layer of the second waveguide optical coupler and the third waveguide branch and the fourth waveguide branch of the second waveguide layer of the first waveguide optical coupler is optically coupled to the distal end of the third waveguide branch and the fourth waveguide branch of the second waveguide layer of the second waveguide optical coupler to form the first waveguide in the integrated photonics interface.

9. The system of claim 1, wherein the first waveguide layer and the second waveguide layer of at least one of the at least two integrated photonics interfaces have a thickness of about 25 nm to about 100 nm.

10. The system of claim 1, wherein the first waveguide layer and the second waveguide layer of the at least one of the at least two integrated photonics interfaces are separated by a distance of about 2.5 µm to about 3.5 µm.

11. The system of claim 1, wherein the first waveguide layer and the second waveguide layer of at least one of the at least two integrated photonics interfaces are embedded in a cladding.

12. The system of claim 11, wherein the cladding comprises a low index material.

13. The system of claim 11, wherein the cladding comprises silicon dioxide, silicon oxynitride, zinc oxide, aluminum oxide, calcium fluoride, or combinations thereof.

14. A system comprising:
an integrated photonics interface including at least two waveguide optical couplers, each of the at least two waveguide optical couplers having a proximal end and a distal end, each of the at least two waveguide optical couplers having a waveguide structure including,
at least two waveguide layers, each waveguide layer extending from the proximal end to the distal end of the integrated photonics interface, a first waveguide layer including a first waveguide branch that extends from the proximal end to the distal end of the integrated photonics interface and a second waveguide branch that extends from the proximal end to the distal end of the integrated photonics interface;
an optical resonator coil comprising a first port and a second port, wherein the first port is optically coupled to the proximal end of a first waveguide optical coupler of the at least two waveguide optical coupler and the second port is optically coupled to the proximal end of a second waveguide optical coupler of the at least two waveguide optical coupler;
the distal end of the first waveguide layer of the first waveguide optical coupler is optically coupled to the distal end of the first waveguide layer of the second waveguide optical coupler and the second waveguide layer of the first waveguide optical coupler is optically coupled to the distal end of the second waveguide layer of the second waveguide optical coupler to form at least a first waveguide in the integrated photonics interface; and
wherein the waveguide structure is configured to match an integrated photonics mode to a fiber mode supported by an optical fiber.

15. The system of claim 14, wherein the first waveguide branch of the first waveguide layer and the second waveguide branch of the first waveguide layer converge at the distal end of the waveguide optical couplers.

16. The system of claim 14, wherein the each of at least two waveguide layers of the at least two waveguide optical couplers are separated from each other layer by a distance of about 2.5 µm to about 3.5 µm.

17. A method, comprising:
receiving a first optical signal and a second optical signal;
communicating a portion of the first optical signal into an optical resonator through a waveguide optical coupler of an integrated photonics interface so that the portion of the first optical signal propagates in a first direction through the optical resonator;
communicating a portion of the second optical signal into the optical resonator through a second waveguide optical coupler of integrated photonics interface so that the portion of the second optical signal propagates in a second direction through the optical resonator, which is opposite the first direction;
wherein each of the first waveguide optical coupler and the second waveguide optical coupler has a proximal end and a distal end, each first and second waveguide optical coupler including at least two waveguide layers extending between the proximal end and a distal end of the first and second waveguide optical couplers, each of a first and second waveguide layer of the at least two waveguide layers including a first waveguide branch that extends from the proximal end to the distal end of the associated first and second waveguide optical coupler and a second waveguide branch that extends from the proximal end to the distal end of the associated first and second waveguide optical coupler, the distal end of the first waveguide layer of the first waveguide optical coupler is optically coupled to the distal end of the first waveguide layer of the second waveguide optical coupler and the second waveguide layer of the first waveguide optical coupler is optically coupled to the distal end of the second waveguide layer of the second waveguide optical coupler to form at least one waveguide in each layer of the integrated photonics interface;

emitting a portion of the first optical signal propagating in the first direction in the optical resonator; and emitting a portion of the second optical signal propagating in the second direction in the optical resonator.

18. The method of claim 17, wherein the first waveguide branch of the first waveguide layer and the second waveguide branch of the first waveguide layer couple at the distal end.

19. The method of claim 17, wherein the first waveguide optical coupler and the second waveguide optical coupler are formed in a multi-layer photonics chip.

20. The method of claim 19, wherein the multi-layer photonics chip comprises on-chip routing architecture.

\* \* \* \* \*

UNITED STATES PATENT AND TRADEMARK OFFICE
CERTIFICATE OF CORRECTION

| | |
|---|---|
| PATENT NO. | : 11,175,140 B2 |
| APPLICATION NO. | : 16/566553 |
| DATED | : November 16, 2021 |
| INVENTOR(S) | : Puckett et al. |

It is certified that error appears in the above-identified patent and that said Letters Patent is hereby corrected as shown below:

In the Claims

At Column 15, Lines 1-2, replace --fourth integrated photonics waveguide optical coupler;-- with "fourth waveguide optical coupler;"

At Column 15, Lines 10-11, replace --sixth integrated photonics waveguide optical coupler;-- with "sixth waveguide optical coupler;"

Signed and Sealed this
Seventeenth Day of May, 2022

Katherine Kelly Vidal
*Director of the United States Patent and Trademark Office*